United States Patent
Sano et al.

(10) Patent No.: US 10,218,426 B1
(45) Date of Patent: Feb. 26, 2019

(54) ANTENNA DEVICE, WIRELESS COMMUNICATION DEVICE AND SIGNAL TRANSMISSION METHOD

(71) Applicant: KABUSHIKI KAISHA TOSHIBA, Minato-ku, Tokyo (JP)

(72) Inventors: Makoto Sano, Kanagawa (JP); Seiya Kishimoto, Tokyo (JP); Makoto Higaki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/907,730

(22) Filed: Feb. 28, 2018

(30) Foreign Application Priority Data

Sep. 11, 2017 (JP) ................................ 2017-174236

(51) Int. Cl.
- *H04B 1/02* (2006.01)
- *H04B 7/06* (2006.01)
- *H01Q 3/36* (2006.01)
- *H01Q 25/00* (2006.01)

(52) U.S. Cl.
CPC ............ *H04B 7/0682* (2013.01); *H01Q 3/36* (2013.01); *H01Q 25/001* (2013.01)

(58) Field of Classification Search
CPC ....... H04B 7/0682; H01Q 3/36; H01Q 25/001
USPC ........................................................ 455/101
See application file for complete search history.

(56) References Cited

U.S. PATENT DOCUMENTS

| | | | |
|---|---|---|---|
| 6,300,900 B1 | 10/2001 | Bleret et al. | |
| 2013/0057449 A1* | 3/2013 | Orihashi | H01Q 21/24 343/853 |
| 2015/0381265 A1* | 12/2015 | Runyon | H01Q 1/288 455/13.3 |

FOREIGN PATENT DOCUMENTS

| | | |
|---|---|---|
| EP | 2 178 170 B1 | 10/2014 |
| JP | S63-238726 A | 10/1988 |
| JP | H06-077916 A | 3/1994 |
| JP | H08-078947 A | 3/1996 |
| JP | 3036159 B2 | 4/2000 |
| JP | 2001-513966 A | 9/2001 |
| JP | 5380997 B2 | 10/2013 |
| JP | 2014-093767 A | 5/2014 |
| WO | WO-2017/119258 A1 | 7/2017 |
| WO | WO-2017/195761 A1 | 11/2017 |
| WO | WO-2017/213102 A1 | 12/2017 |

* cited by examiner

*Primary Examiner* — Sanh D Phu
(74) *Attorney, Agent, or Firm* — Foley & Lardner LLP

(57) ABSTRACT

According to one embodiment, an antenna device includes a branch circuit, a first phase shifter, a second phase shifter and a radiating element. The branch circuit divides an input signal and generates a first signal and a second signal. The first phase shifter is capable of shifting a phase of the first signal. The second phase shifter is capable of shifting a phase of the second signal. The radiating element transmits a right-hand circularly polarized wave based on a first output signal of the first phase shifter and transmits a left-hand circularly polarized wave based on a second output signal of the second phase shifter.

12 Claims, 6 Drawing Sheets

ANTENNA DEVICE, WIRELESS COMMUNICATION DEVICE AND SIGNAL TRANSMISSION METHOD

CROSS REFERENCE TO RELATED APPLICATIONS

This application is based upon and claims the benefit of priority from the prior Japanese Patent Application No. 2017-174236, filed on Sep. 11, 2017, the entire contents of which are incorporated herein by reference.

FIELD

Embodiments described herein relate to an antenna device, a wireless communication device and a signal transmission method.

BACKGROUND

Among variable-polarization-plane antennas provided with a right-hand circularly polarized antenna and a left-hand circularly polarized antenna, a configuration is known in which a phase shifter is connected to a feeder of one of the right-hand circularly polarized antenna and the left-hand circularly polarized antenna. Thereby, it is possible to change a polarization plane of a linearly polarized wave only by controlling a phase shift amount of the one phase shifter.

However, there is a problem that an amplitude difference between a right-hand and a left-hand circularly polarized waves occurs due to insertion loss of the phase shifter, and cross polarization discrimination deteriorates (a cross polarization component increases). Further, in order to maximize a variable range of the polarization plane of the linearly polarized wave (0 to) 180°, it is necessary to cause a variable range of the phase shift amount of the phase shifter to be 0 to 360°. That is, it is necessary to increase the variable range of the phase shift amount. A phase shifter the phase shift amount variable range of which is large has such problems that the phase shifter is physically large, that insertion loss is large, and that fluctuation of insertion loss caused by change in the phase shift amount and frequency is large.

On the other hand, a polarization plane control antenna is also known which controls a phase of one of a right-hand circularly polarized wave and a left-hand circularly polarized wave by a phase shifter and controls amplitudes of both waves by amplifiers, respectively. According to the polarization plane control antenna, it is possible to, by compensating fluctuation of insertion loss of the phase shifter by the amplifiers, the cross polarization discrimination can be improved.

However, since the insertion loss of the phase shifter differs according to frequency, it is necessary to adjust an amplitude according to frequency for transmission/reception, and there is a problem that configurations of each amplifier and the phase shifter are complicated. Further, it is difficult to use a wide frequency band while maintaining preferable cross polarization discrimination. In addition, there is also a problem that a waveform of a transmitted/received high-frequency signal is distorted by the variable amplifiers, a problem that harmonics occur, and the like.

DETAILED DESCRIPTION

According to one embodiment, an antenna device includes a branch circuit, a first phase shifter, a second phase shifter and a radiating element. The branch circuit divides an input signal and generates a first signal and a second signal. The first phase shifter is capable of shifting a phase of the first signal. The second phase shifter is capable of shifting a phase of the second signal. The radiating element transmits a right-hand circularly polarized wave based on a first output signal of the first phase shifter and transmits a left-hand circularly polarized wave based on a second output signal of the second phase shifter.

An embodiment of the present invention will be described with reference to drawings.

Figure 1:
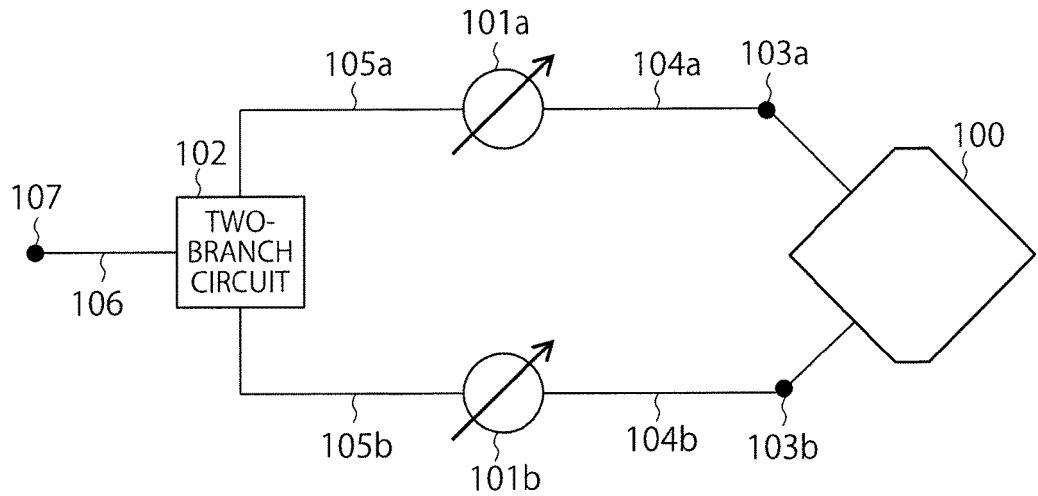
FIG. 1 is a diagram showing a schematic configuration of an antenna device according to an embodiment of the present invention.

FIG. 1 shows an example of a schematic configuration of an antenna device according to the embodiment of the present invention.

The antenna device in FIG. 1 is provided with a radiating element 100, a first phase shifter 101a, a second phase shifter 101b and a branch circuit (hereinafter referred to as a two-branch circuit) 102.

The radiating element 100 is connected to the first phase shifter 101a via a transmission line 104a. The radiating element 100 is connected to the second phase shifter 101b via a transmission line 104b. The first phase shifter 101a is connected to the two-branch circuit 102 via a transmission line 105a. The second phase shifter 101b is connected to the two-branch circuit 102 via a transmission line 105b. The two-branch circuit 102 is connected to an input/output terminal 107 of a high-frequency circuit via a transmission line 106.

The radiating element 100 transmits and receives a right-hand circularly polarized wave and a left-hand circularly polarized wave. The radiating element 100 is provided with an input/output terminal 103a for the right-hand circularly polarized wave and an input/output terminal 103b for the left-hand circularly polarized wave. By using the right-hand circularly polarized wave input/output terminal 103a, the right-hand circularly polarized wave can be transmitted/received. By using the left-hand circularly polarized wave input/output terminal 103b, the left-hand circularly polarized wave can be transmitted/received. By using the right-hand circularly polarized wave input/output terminal 103a and the left-hand circularly polarized wave input/output terminal 103b at the same time, the right-hand circularly polarized wave and the left-hand circularly polarized wave can be transmitted/received at the same time. More specifically, at the time of transmission, a linearly polarized wave is transmitted from the radiating element 100 by combining right-hand and left-hand circularly polarized waves. At the time of reception, a linearly polarized wave received by the radiating element 100 is separated into a right-hand circularly polarized wave and a left-hand circularly polarized wave, and a high-frequency signal of the right-hand circularly polarized wave and a high-frequency signal of the left-hand circularly polarized wave are outputted from the input/output terminals 103a and 103b, respectively. As a specific example of the radiating element 100, a patch antenna provided with perturbation elements can be used.

Figure 2:
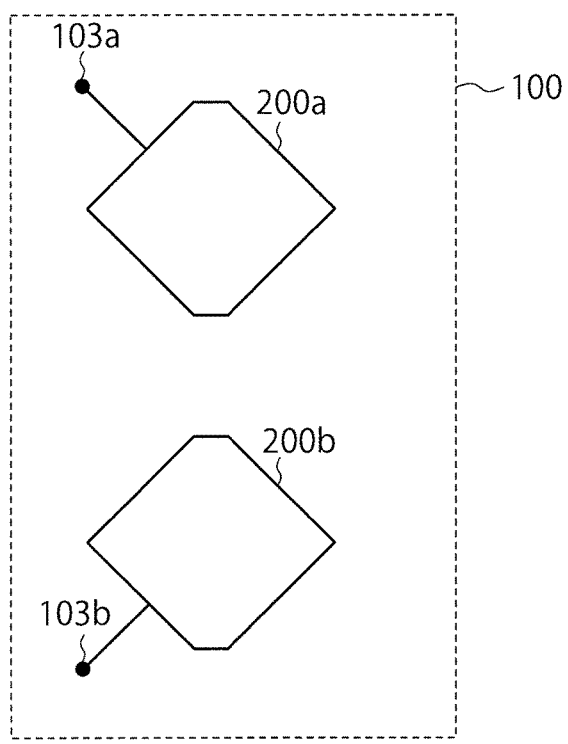
FIG. 2 is a diagram showing a modification of a radiating element.
Figure 3:
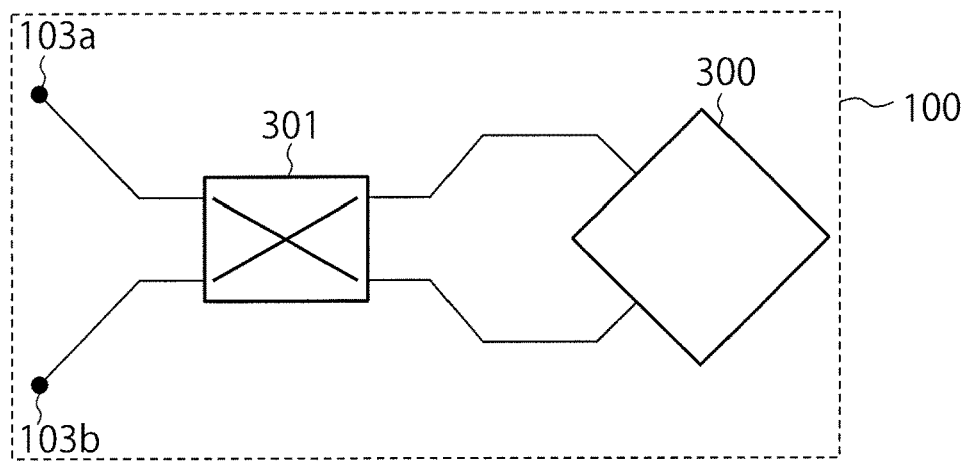
FIG. 3 is a diagram showing a modification of the radiating element.
Figure 4:
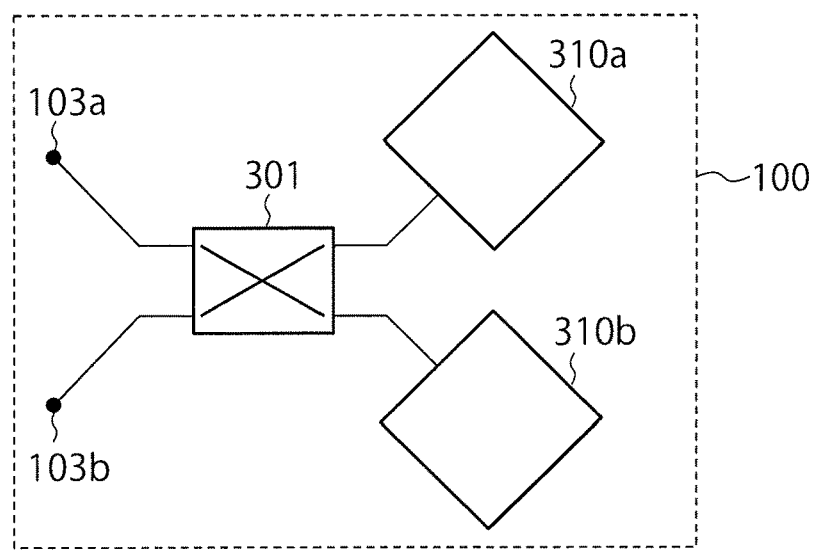
FIG. 4 is a diagram showing a modification of the radiating element.

A modification of the radiating element 100 will be described with reference to FIGS. 2, 3 and 4. As shown in FIG. 2, the radiating element 100 may be configured with two radiating elements, a radiating element 200a configured to radiate a right-hand circularly polarized wave and a radiating element 200b configured to radiate a left-hand circularly polarized wave. Further, the radiating element 100 may be configured by connecting an external circuit 301, such as a 90° hybrid coupler, to a dual linearly polarized antenna 300 for generating two orthogonal linearly polarized waves as in FIG. 3. In this case, by giving a phase difference of ±90° to the two orthogonal linearly polarized wave signals which are inputted, by the external circuit 301, the right-hand circularly polarized wave and the left-hand circularly polarized wave are generated by the dual linearly polarized antenna 300. Further, the dual linearly polarized antenna 300 in FIG. 3 may be divided into two. FIG. 4 shows a configuration example in this case. Linear polarization antennas 310a and 310b corresponding to two orthogonal linearly polarized waves, respectively, are connected to the external circuit 301. By the external circuit 301 giving the phase difference of ±90° to high-frequency signals of the two orthogonal linearly polarized waves which are inputted, a right-hand circularly polarized wave and a left-hand circularly polarized wave can be generated by the linear polarization antennas 310a and 310b, respectively. In addition, a sequential array which generates a circularly polarized wave by giving phase differences to a plurality of antennas for linearly polarized waves to excite the antennas may be used as the radiating element 100.

The radiating element 100 and the antennas 200a, 200b, 300, 301, 310a and 310b are not limited to those illustrated above. Any antenna is possible if the antenna can transmit/receive a right-hand circularly polarized wave and a left-hand circularly polarized wave, or one of them. For example, a dipole antenna, a helical antenna, a spiral antenna, a loop antenna, a dielectric resonator antenna, an antenna using a waveguide provided with a septum polarizer or an orthogonal mode transducer, a slot antenna, a reflector antenna, a lens antenna, an antenna using a meta-surface and the like are possible, and a combination thereof is also possible. An array antenna in which a plurality of these antennas are arrayed is also possible.

The right-hand circularly polarized wave input/output terminal 103a is electrically connected to the transmission line 104a. The left-hand circularly polarized wave input/output terminal 103b is electrically connected to the transmission line 104b. As an example, the input/output terminal 103a has a structure enabling the transmission line 104a to be attached to or detached from the radiating element 100 like a coaxial cable connector or a wave guide connector. Otherwise, the transmission line 104a and the radiating element 100 may be, for example, fixedly combined or integrally formed (that is, in a configuration in which the transmission line 104a cannot be attached to or detached from the radiating element 100). In this case, an arbitrary point on the transmission line 104a may be defined as the right-hand circularly polarized wave input/output terminal 103a. The input/output terminal 103b is similar to the input/output terminal 103a.

The first phase shifter 101a is a phase shifter capable of changing a phase of a high-frequency signal to be transmitted from the transmission line 104a to the transmission line 105a or a high-frequency signal to be transmitted from the transmission line 105a to the transmission line 104a. Similarly, the second phase shifter 101b is a phase shifter capable of changing a phase of a high-frequency signal to be transmitted from the transmission line 104b to the transmission line 105b or a high-frequency signal to be transmitted from the transmission line 105b to the transmission line 104b. The first phase shifter 101a adjusts a phase of an inputted high-frequency signal, and the second phase shifter 101b adjusts a phase of an inputted high-frequency signal. To adjust a phase includes the case of maintaining the same phase in addition to the case of shifting a phase.

Insertion losses of the first phase shifter 101a and the second phase shifter 101b are substantially equal when the frequencies of the inputted high-frequency signals are the same, and phase shift amounts are the same. Being substantially equal includes both of the case of being equal and the case of being almost equal. As an example of the case of being almost equal, a case where an insertion loss difference is within a predetermined error range is given. The predetermined error range can be, as an example, specified according to quality or performance required for communication. A configuration of the first phase shifter 101a may be the same as the second phase shifter 101b. Specifically, the first phase shifter 101a and the second phase shifter 101b may be products with the same model number. Further, the first phase shifter 101a and the second phase shifter 101b may be devices having the same pattern.

The first phase shifter 101a and the second phase shifter 101b may be analog phase shifters the phase shift amount of which can be continuously changed or may be digital phase shifters the phase shift amount of which can be discretely switched. The first phase shifter 101a and the second phase shifter 101b may be phase shifters configured to switch a line length with a PIN diode, an FET or MEMS switch or the like or may be ferrite phase shifters or MEMS phase shifters, or may be reflective phase shifters in which a variable impedance element such as a varactor diode or a transmission line the line length of which can be switched, and a 90° hybrid coupler are combined.

The transmission lines 104a, 104b, 105a, 105b and 106 are transmission lines for transmitting high-frequency signals, such as microstrip lines, coplanar lines, strip lines, parallel two-wire lines, coaxial lines and wave guides. As an example, the transmission line 104a and the transmission line 104b are transmission lines with the same structure, and the transmission line 105a and the transmission line 105b are transmission lines with the same structure. Types of the transmission lines 104*a*, 105*a* and 106 may be different from one another. Similarly, types of the transmission lines 104*b*, 105*b* and 106 may be different from one another.

Further, a circuit element attached to the first phase shifter 101*a* may be connected to the transmission lines 104*a* and 105*a*. Similarly, a circuit element attached to the second phase shifter 101*b* may be connected to the transmission lines 104*b* and 105*b*. Further, a circuit element attached to the two-branch circuit 102 may be connected to the transmission line 106.

At the time of transmission, the two-branch circuit 102 divides a high-frequency signal (an input signal) inputted from the transmission line 106 into two and outputs them to the transmission lines 105*a* and 105*b*. Further, at the time of reception, the two-branch circuit 102 combines high-frequency signals inputted from the transmission lines 105*a* and 105*b* and outputs the combined high-frequency signal to the transmission line 106. As examples of the two-branch circuit 102, a Wilkinson divider, a T junction, a magic Tee, a 90° hybrid, a rat-race coupler are given.

The input/output terminal 107 is, as an example, a connector or the like capable of attaching or detaching the transmission line 106 to or from a high-frequency circuit (for example, an amplifier). Otherwise, the transmission line 106 and the high-frequency circuit may be fixedly combined or integrally formed (that is, in a configuration in which the transmission line 106 cannot be attached to or detached from the high-frequency circuit). In this case, an arbitrary point on the transmission line 106 may be defined as the input/output terminal 107 of the high-frequency circuit.

According to the antenna device in FIG. 1, it is possible to, only by changing a phase shift amount of at least one of the first phase shifter 101*a* and the second phase shifter 101*b* to adjust a relative phase difference between a right-hand circularly polarized wave and a left-hand circularly polarized wave, preferably maintain cross polarization discrimination over a wide frequency band and change a polarization plane of a linearly polarized wave.

An operation principle of the antenna device in FIG. 1 is shown below. An electric field "$E_{RHCP}$" of a right-hand circularly polarized wave and an electric field "$E_{LHCP}$" of a left-hand circularly polarized wave are expressed as blow.

$$E_{RHCP} = \frac{1}{\sqrt{2}}(E_x + jE_y) \quad \text{[Formula 1]}$$

$$E_{LHCP} = \frac{1}{\sqrt{2}}(E_x - jE_y)$$

Here, "$E_x$" and "$E_y$" indicate "x" and "y" components of each electric field. When a phase shift amount of the first phase shifter 101*a* is indicted by "$\psi_1$", and a phase shift amount of the second phase shifter 101*b* is indicted by "$\psi_2$", an electric field "E" obtained by combining "$E_{RHCP}$" and "$E_{LHCP}$" with equal amplitudes is expressed as:

$$E = E_{RHCP}\exp(-j\psi_1) + E_{LHCP}\exp(-j\psi_2) = \quad \text{[Formula 2]}$$
$$\frac{1}{\sqrt{2}}[\exp(-j\psi_1) + \exp(-j\psi_2)]E_x +$$
$$j\frac{1}{\sqrt{2}}[\exp(-j\psi_1) - \exp(-j\psi_2)]E_y$$

For example, when "$\psi_1$"="$\psi_2$"=0° is satisfied, the following formula is satisfied:

$$E=\sqrt{2}E_x \quad \text{[Formula 3]}$$

A linearly polarized wave the polarization plane of which is an "xz" plane ("φ"=0°; "φ" is a rotation angle from an "x" axis) is obtained.

When "$\psi_1$"=90° and "$\psi_2$"=0° are satisfied, the following formula is satisfied:

$$E = \frac{1}{\sqrt{2}}(1-j)(E_x + E_y) \quad \text{[Formula 4]}$$

A linearly polarized wave with a polarization plane of "φ"=45° is obtained.

When "$\psi_1$"=180° and "$\psi_2$"=0° are satisfied, the following formula is satisfied:

$$E=-j\sqrt{2}E_y \quad \text{[Formula 5]}$$

A linearly polarized wave with a polarization plane of "φ"=90° is obtained.

Thus, by changing "$\psi_1$" within a range of 0° to 180° in a state that the phase shift amount of the second phase shifter 101*b* is fixed to "$\psi_2$"=0°, a polarization plane of a linearly polarized wave can be changed within a range of "φ"=0 to 90°.

Similarly, when "$\psi_1$"=0° and "$\psi_2$"=90° are satisfied, the following formula is satisfied:

$$E = \frac{1}{\sqrt{2}}(1-j)(E_x - E_y) \quad \text{[Formula 6]}$$

A linearly polarized wave with a polarization plane of "φ"=−45° is obtained.

When "$\psi_1$"=0° and "$\psi_2$"=180° are satisfied, the following formula is satisfied:

$$E=j\sqrt{2}E_y \quad \text{[Formula 7]}$$

A linearly polarized wave with a polarization plane of "φ"=−90° is obtained.

Therefore, by changing "$\psi_2$" within the range of 0° to 180° in a state that the phase shift amount of the first phase shifter 101*a* is fixed to "$\psi_1$"=0°, a polarization plane of a linearly polarized wave can be changed within a range of "φ"=0 to −90°.

Figure 5:
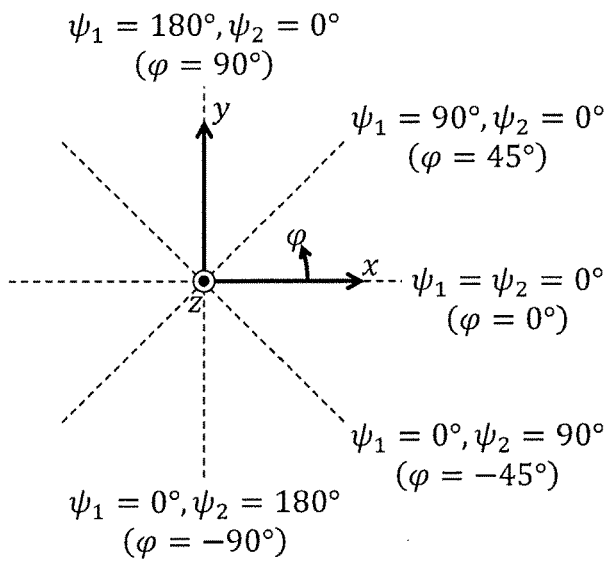
FIG. 5 is a diagram showing a relationship between phase shift amounts of a first phase shifter and a second phase shifter and a polarization plane.

Here, as shown in FIG. 5, "φ"=90° and "φ"=−90° indicate the same polarization plane. From the above, when both of phase shift amount ranges of the first phase shifter 101*a* and the second phase shifter 101*b* are 0 to 180°, it is possible to, by adjusting the phase shift amounts of the first phase shifter 101*a* and the second phase shifter 101*b*, realize a linearly polarized wave with an arbitrary polarization plane.

A variable-polarization-plane antenna according to a related-art technique will be described. In this antenna device according to the related-art technique, a phase shift amount is given only to a right-hand circularly polarized wave (or a left-hand circularly polarized wave) by a phase shifter as indicated by the following formula:

$$E=E_{RHCP}\exp(-j\psi_1)+E_{LHCP} \quad \text{[Formula 8]}$$

In this case, in order to realize an arbitrary polarization plane, it is necessary to set a phase shift amount of the phase shifter to be 0 to 360°. When the phase shift amount of the phase shifter is increased, there are problems such as that the phase shifter is physically large-sized, that insertion loss is increased and that fluctuation of insertion loss when at least one of the phase shift amount and frequency changes is increased. By the insertion loss of the phase shifter or the fluctuation of the insertion loss, a large amplitude difference occurs between the right-hand circularly polarized wave and the left-hand circularly polarized wave in the antenna device of the related-art technique, and the cross polarization discrimination deteriorates.

Figure 6:
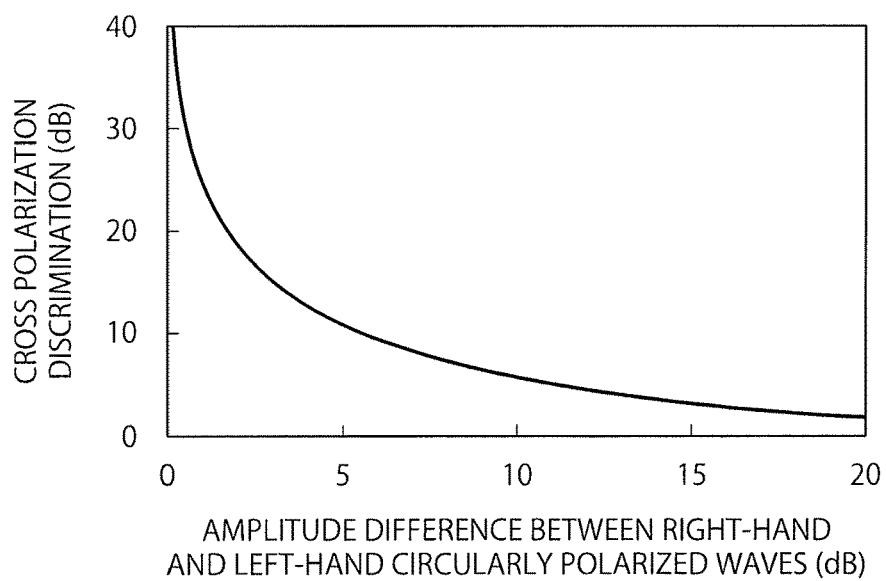
FIG. 6 is a diagram showing a relationship between an amplitude difference between a right-hand circularly polarized wave and a left-hand circularly polarized wave, and cross polarization discrimination.

FIG. 6 shows an example of a graph of a relationship between an amplitude difference between a right-hand circularly polarized wave and a left-hand circularly polarized wave, and the cross polarization discrimination.

When insertion loss of a phase shifter is 0 dB, amplitudes of the right-hand circularly polarized wave and the left-hand circularly polarized wave become equal, and the cross polarization discrimination becomes infinite. Actually, however, it is not possible to realize a phase shifter the insertion loss of which is 0 dB. When the insertion loss of the first phase shifter 101a is, for example, 6 dB and the insertion loss of the second phase shifter 101b is 1 dB, the right-hand circularly polarized wave is lower than the left-hand circularly polarized wave by 5 dB, and the cross polarization discrimination deteriorates to 12.9 dB. Though the amplitude difference between the right-hand and left-hand circularly polarized waves can be reduced by using an amplitude adjustment circuit such as a variable amplifier, it is necessary to adjust gain of the amplitude adjustment circuit according to the phase shift amount and frequency of the phase shifter, and, therefore, a problem occurs that a control circuit for performing such control is complicated.

On the other hand, in the antenna device according to the present embodiment, both of a right-hand circularly polarized wave transmission line and a left-hand circularly polarized wave transmission line are provided with phase shifters the insertion losses of which are substantially equal (the first phase shifter 101a and the second phase shifter 101b), respectively. When the phase shift amounts of the first phase shifter 101a and the second phase shifter 101b are the same, amplitude difference between the right-hand and left-hand circularly polarized waves are decreased, and the amplitudes become substantially equal. That is, an amplitude difference between the right-hand and left-hand circularly polarized waves does not occur or included within a predetermined error range. When the phase shift amount of one of the first phase shifter 101a and the second phase shifter 101b is changed, the insertion loss of the phase shifter for which the phase shift amount has been changed fluctuates, and the insertion losses of the phase shifters become different from each other. However, if the fluctuation of the insertion loss is 0.5 dB or less, that is, the insertion loss difference is 0.5 dB or less, the cross polarization discrimination is 30.8 dB or more. Further, even if the fluctuation of the insertion loss is 1.0 dB or less, the cross polarization discrimination is 24.8 dB or more. Therefore, even if the phase shift amount of any one of the phase shifters is changed, preferable cross polarization discrimination can be obtained.

In the antenna device according to the present embodiment, a phase shift amount required to realize an arbitrary polarization plane of a linearly polarized wave is 180°, and this is smaller than 360°, a phase shift amount required by the antenna device of the related-art technique. Further, it is relatively easy to design a phase shifter with a small phase shift range the insertion loss of which fluctuates less. Therefore, according to the present embodiment, it is possible to realize a variable-polarization-plane antenna having preferable cross polarization discrimination without using an amplitude adjustment circuit. Further, when the first phase shifter 101a and the second phase shifter 101b are in the same configuration, variations in insertion losses at the time when the phase shift amounts change are equal, and variations in insertion losses at the time when frequencies change are equal. Therefore, it is possible to realize preferable cross polarization discrimination in a wider frequency band.

Figure 7:
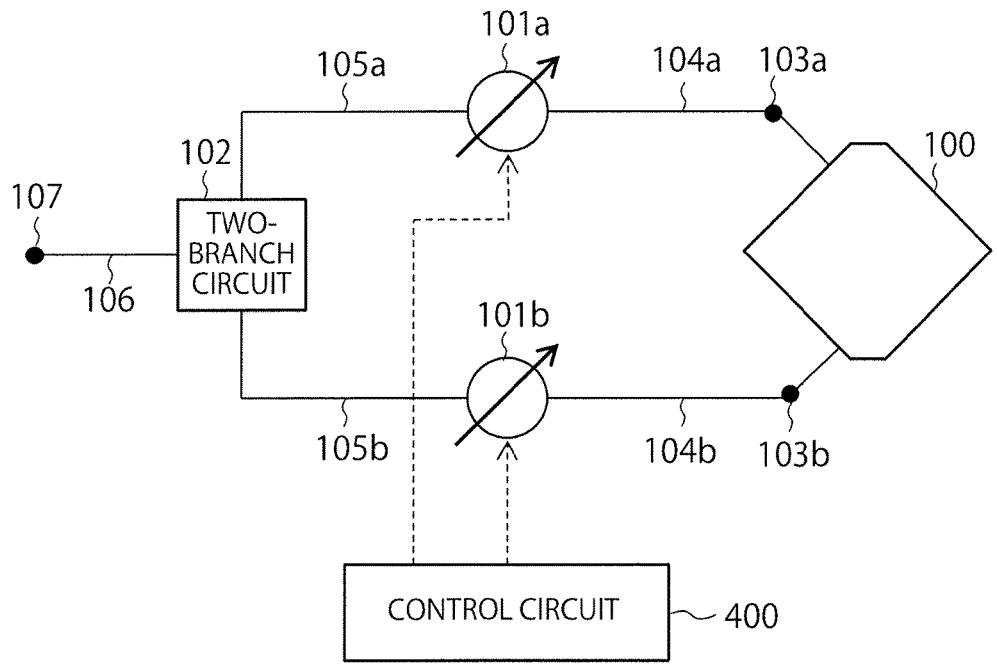
FIG. 7 is a diagram showing a configuration example in which a control circuit is connected to the antenna device according to the embodiment of the present invention.

FIG. 7 shows a configuration in which a control circuit configured to adjust the phase shift amounts of the first phase shifter 101a and the second phase shifter 101b is added to the antenna device in FIG. 1. A control circuit 400 is connected to the antenna device in FIG. 1. The control circuit 400 adjusts the phase shift amounts of the first phase shifter 101a and the second phase shifter 101b. When the phase shift amount ranges of the first phase shifter 101a and the second phase shifter 101b are the same, phase shift amounts of a right-hand circularly polarized wave and a left-hand circularly polarized wave can be controlled in the same method, and a control scheme can be facilitated. Therefore, a configuration of the control circuit 400 can be simplified. The control circuit 400 may be configured with a dedicated circuit or may be configured with a processor such as a CPU which executes software.

Figure 8:
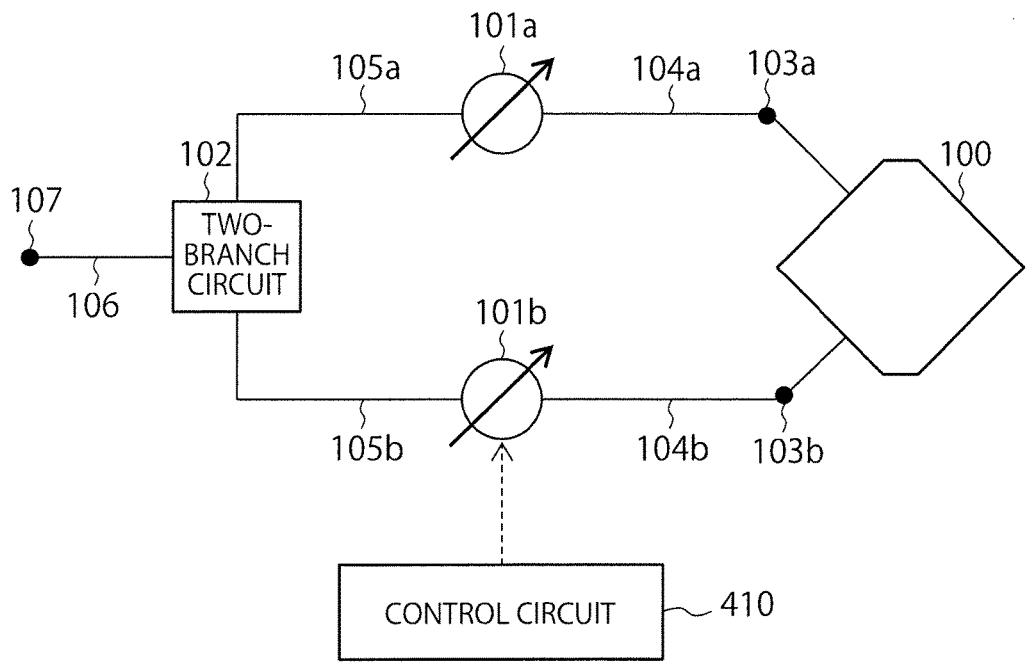
FIG. 8 is a diagram showing a configuration example in which the control circuit is connected to the antenna device according to the embodiment of the present invention.

The control circuit 400 may fix the phase shift amount of one of the first phase shifter 101a and the second phase shifter 101b and continuously change the phase shift amount of the other phase shifter. Thereby, a polarization plane may be continuously changed. In this case, only one of the two phase shifters can be a control target. Thereby, the configuration and control scheme of the control circuit can be further simplified. FIG. 8 shows a configuration example in the case of controlling only the phase shift amount of the second phase shifter 101b. A control circuit 410 controls only the phase shift amount of the second phase shifter 101b. The phase shift amount of the first phase shifter 101a is fixed to a predetermined value.

The predetermined value may be a maximum or minimum value of the phase shift amount range of the first phase shifter 101a. Thereby, a polarization plane variable range can be maximized. For example, by using phase shifters with a phase shift amount of 0 to 180° are used as the first phase shifter 101a and the second phase shifter 101b, fixing the phase shift amount of the first phase shifter 101a to 0° or 180° and changing the phase shift amount of the second phase shifter 101b within a range of 0 to 180°, the polarization plane variable range is maximized. Though the second phase shifter 101b is a control target here, the first phase shifter 101a may be controlled instead of the second phase shifter 101b. In this case, by fixing the phase shift amount of the second phase shifter 101b to 0° or 180° and changing the phase shift amount of the first phase shifter 101a within the range of 0 to 180°, the polarization plane variable range is maximized.

Further, when a sum of lengths of the transmission lines 104a and 105a and a sum of lengths of the transmission lines 104b and 105b are substantially equal, change in a phase and amplitude of a high-frequency signal of a right-hand circularly polarized wave by the transmission lines 104a and 105a is substantially equal to change in a phase and amplitude of a high-frequency signal of a left-hand circularly polarized wave by the transmission lines 104b and 105b, and, therefore, the cross polarization discrimination can be improved. If the sum of the lengths of the transmission lines 104a and 105a and the sum of the lengths of the transmission lines 104b and 105b are substantially equal, a similar effect can be obtained even if the lengths of the transmission lines 105a and 105b are different from each other.

Figure 9:
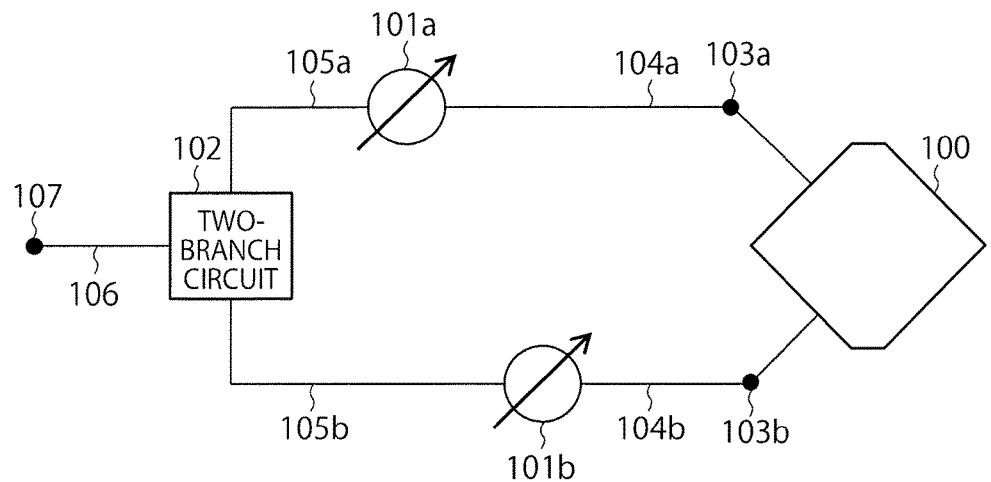
FIG. 9 is a diagram showing a modification of the antenna device according to the embodiment of the present invention.

FIG. 9 shows a configuration example of an antenna device in the case where the lengths of the transmission line 105a and the transmission line 105b are different from each other. The lengths of the transmission line 105a and the transmission line 105b are different from each other, and the lengths of the transmission line 104a and the transmission line 104b are also different from each other. However, the sum of the lengths of the transmission line 104a and the transmission line 105a and the sum of the lengths of the transmission line 104b and the transmission line 105b are substantially equal. Therefore, changes in the amplitudes and phases of high-frequency signals of right-hand and left-hand circularly polarized waves due to the transmission lines 104a, 104b, 105a and 105b are substantially equal, and the cross polarization discrimination can be improved.

Figure 10:
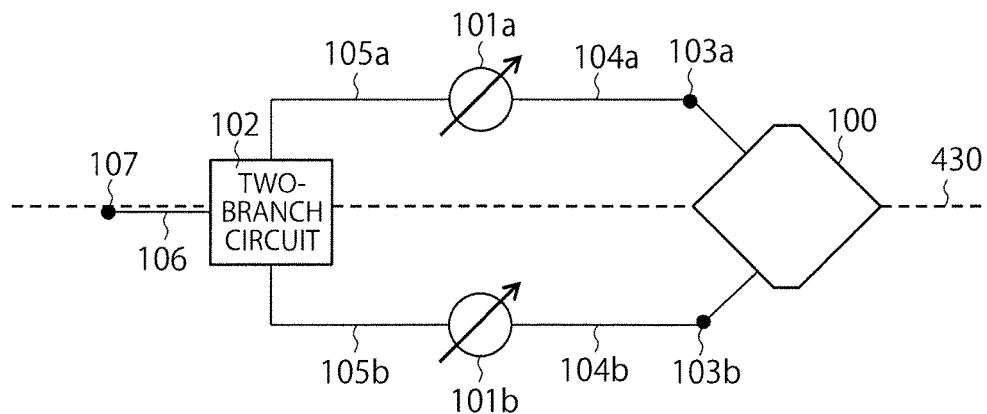
FIG. 10 is a diagram showing a modification of the antenna device according to the embodiment of the present invention.

Further, FIG. 10 shows a configuration example of a case where shapes of the transmission lines 105a and 105b are substantially symmetrical when seen from the two-branch circuit 102 (including a case where the shapes are symmetrical). Being substantially symmetrical when seen from the two-branch circuit 102 means, as an example, being symmetrical relative to a symmetry axis 430 passing through a center of the two-branch circuit 102 (for example, a signal branch point or combination point) and a center of the radiating element 100. The symmetry axis 430 is a virtual line. At this time, frequency characteristics of amplitude/phase variation of high-frequency signals of right-hand and left-hand circularly polarized waves through the transmission lines 105a and 105b are equal, and, therefore, preferable cross polarization discrimination can be realized in a wider frequency band.

Further, a shape of the two-branch circuit 102 may be substantially symmetrical when seen from the transmission line 106. In this case, since the two-branch circuit 102 becomes wideband, the antenna device operates in a wider frequency band.

When dividing a high-frequency signal supplied from the transmission line 106, the two-branch circuit 102 may divide the signal with substantially equal amplitudes (including the case of the same amplitudes). Thereby, more preferable cross polarization discrimination can be realized. Further, if high-frequency signals supplied from the transmission lines 105a and 105b have substantially equal amplitudes, these signals are combined with substantially equal amplitudes, and, therefore, more preferable cross polarization discrimination can be realized. The two-branch circuit 102 does not have to perform distribution/combination with equal phases.

Figure 11:
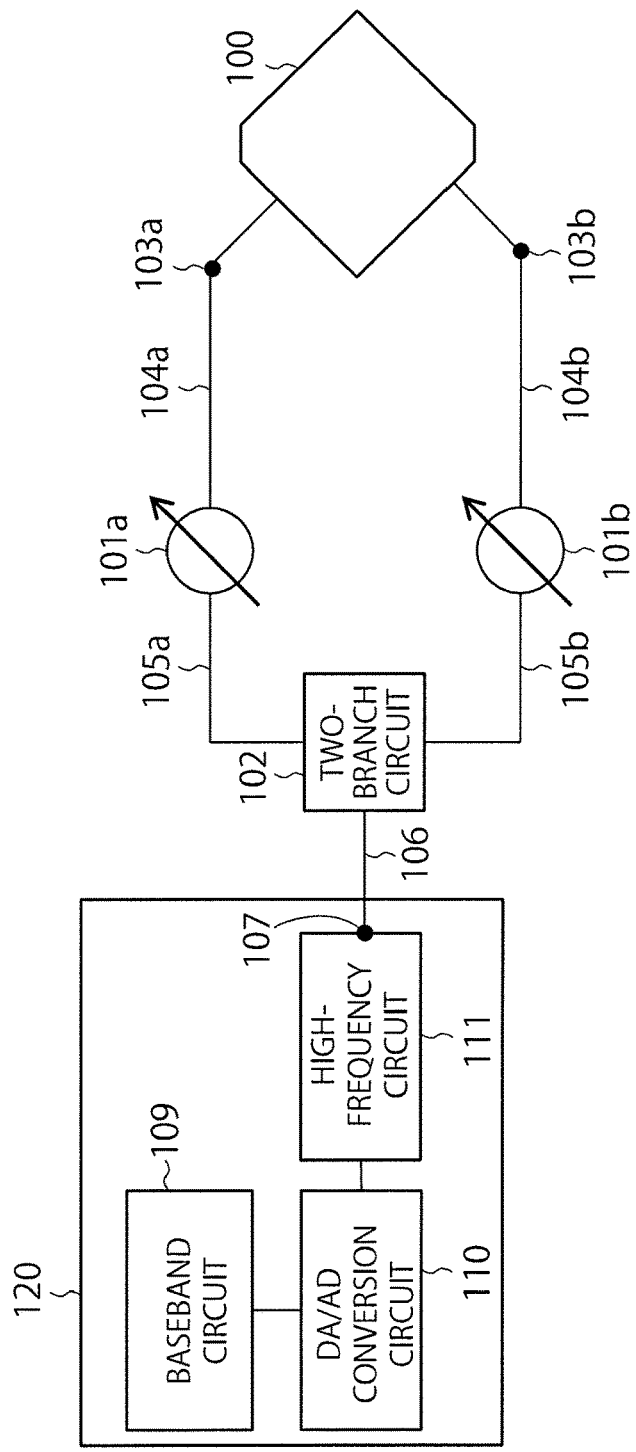
FIG. 11 is a diagram showing an example of a wireless communication device provided with the antenna device according to the embodiment of the present invention and a wireless communication circuit.

FIG. 11 shows a configuration example of a wireless communication device provided with the antenna device in FIG. 1 and a wireless communication circuit 120. The wireless communication circuit 120 performs wireless communication with a counterpart wireless communication device using the antenna device. The wireless communication circuit 120 includes a baseband circuit 109, a DA/AD conversion circuit 110 and a high-frequency circuit 111. The baseband circuit 109 generates a frame or a packet in conformity with a communication scheme, specifications and the like to be used, and encodes and modulates a digital signal of the generated frame or packet. The DA/AD conversion circuit 110 converts the modulated digital signal to an analog signal. The high-frequency circuit 111 extracts a signal of a desired band from the analog signal by band control, converts frequency of the extracted signal to radio frequency, amplifies the signal after the conversion (a high-frequency signal) with an amplifier and outputs the signal to the two-branch circuit 102. The amplifier of the high-frequency circuit 111 is connected to the transmission line 106 via the input/output terminal 107. At the time of reception, the high-frequency circuit 111 receives a high-frequency signal from the two-branch circuit 102. The high-frequency circuit 111 performs low noise amplification of the received signal with an LNA, extracts a signal of a desired band from the amplified signal, and performs frequency conversion of the extracted signal to obtain a baseband signal, and outputs the baseband signal to the DA/AD conversion circuit 110. The LNA of the high-frequency circuit 111 is connected to the transmission line 106 via the input/output terminal 107. The DA/AD conversion circuit 110 converts the inputted baseband signal to a digital signal and outputs the digital signal to the baseband circuit 109. The baseband circuit 109 demodulates and decodes the inputted digital signal to acquire a frame or packet.

The present antenna device is advantageous when a polarization plane of an antenna of a wireless communication counterpart, such as an access point, a base station, a radar and a remote controller of a wireless LAN (Local Area Network), is unknown or when the communication counterpart is moving. It is possible to adjust an antenna to the polarization plane of the antenna of the counterpart without mechanically moving the antenna. Improvement of communication quality and communication distance, multi-functionalization of a radar and the like can be expected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An antenna device comprising:
a branch circuit configured to divide an input signal and generate a first signal and a second signal;
a first phase shifter configured to be capable of shifting a phase of the first signal;
a second phase shifter configured to be capable of shifting a phase of the second signal; and
a radiating element configured to transmit a right-hand circularly polarized wave based on a first output signal of the first phase shifter and transmit a left-hand circularly polarized wave based on a second output signal of the second phase shifter,
wherein insertion loss of the first phase shifter is substantially equal to insertion loss of the second phase shifter.

2. The antenna device according to claim 1, wherein a sum of lengths of a transmission line connecting the branch circuit and the first phase shifter and a transmission line connecting the first phase shifter and the radiating element is substantially equal to a sum of lengths of a transmission line connecting the branch circuit and the second phase shifter and a transmission line connecting the second phase shifter and the radiating element.

3. The antenna device according to claim 1, wherein a shape of the branch circuit is substantially symmetrical when seen from a transmission line supplying the input signal to the branch circuit.

4. The antenna device according to claim 1, wherein a shape of the transmission line connecting the branch circuit and the first phase shifter and a shape of the transmission line connecting the branch circuit and the second phase shifter are substantially symmetrical when seen from the branch circuit.

5. The antenna device according to claim 1, wherein amplitudes of the first signal and the second signal are substantially equal.

6. The antenna device according to claim 1, wherein a range of a phase shift amount of the first phase shifter is equal to a range of a phase shift amount of the second phase shifter.

7. The antenna device according to claim 1, wherein the first phase shifter has the same configuration as the second phase shifter.

8. The antenna device according to claim 1, further comprising a control circuit configured to, in a state of fixing a phase shift amount of one of the first phase shifter and the second phase shifter, cause a phase shift amount of the other to change.

9. The antenna device according to claim 8, wherein the control circuit is further configured to fix the phase shift amount of the one of the phase shifters to a maximum or minimum value of a range of the phase shift amount.

10. A wireless communication device comprising:
the antenna device according to claim 1; and
a wireless communication circuit configured to perform wireless communication using the antenna device.

11. A signal transmission method comprising:
dividing an input signal and generating a first signal and a second signal;
adjusting a phase of the first signal by a first phase shifter;
adjusting a phase of the second signal by a second phase shifter; and
transmitting a right-hand circularly polarized wave based on the first signal phase-adjusted by the first phase shifter;
transmitting a left-hand circularly polarized wave based on the second signal phase-adjusted by the second phase shifter,
wherein insertion loss of the first phase shifter is substantially equal to insertion loss of the second phase shifter.

12. The antenna device according to claim 8, wherein the control circuit is further configured to fix the phase shift amount of the one of the first phase shifter and the second phase shifter to 0 degree or 180 degree, and change the phase shift amount of the other of the first phase shifter and the second phase shifter between 0 degree and 180 degree.

* * * * *